J. H. FRIEDENWALD.
DECANTER.
APPLICATION FILED DEC. 6, 1909.

950,321.

Patented Feb. 22, 1910.

Attest:
Ewd L. Tolson
Edward N. Sarton

Inventor:
J. H. Friedenwald,
By Spear, Middleton, Donaldson & Spear
Attys.

UNITED STATES PATENT OFFICE.

JACOB H. FRIEDENWALD, OF BALTIMORE, MARYLAND.

DECANTER.

950,321.  Specification of Letters Patent.  Patented Feb. 22, 1910.

Application filed December 6, 1909.  Serial No. 531,729.

*To all whom it may concern:*

Be it known that I, JACOB H. FRIEDENWALD, a citizen of the United States, residing at Baltimore, Maryland, have invented certain new and useful Improvements in Decanters, of which the following is a specification.

My invention relates to a holder for glasses in connection with a decanter of usual or ordinary design.

My object is to utilize, in connection with a decanter of the ordinary shape, a readily removable holder for wine glasses held in place by the stopper of the decanter.

Figure 1:
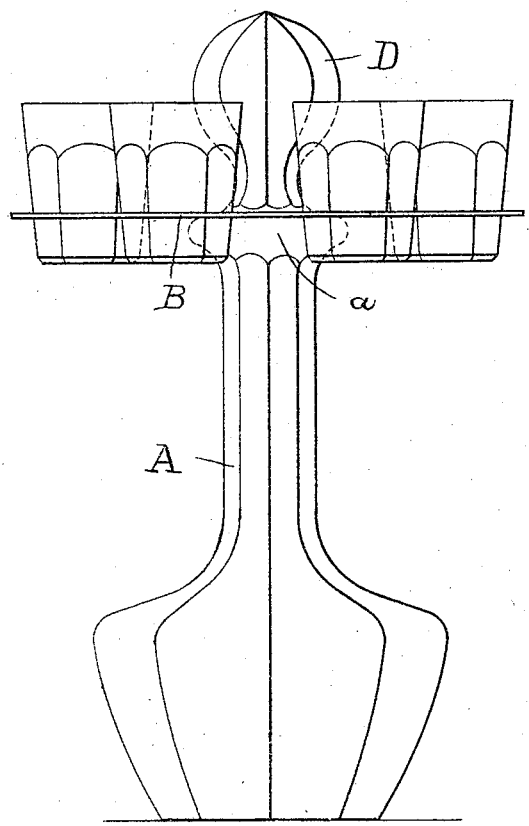
Figure 2:
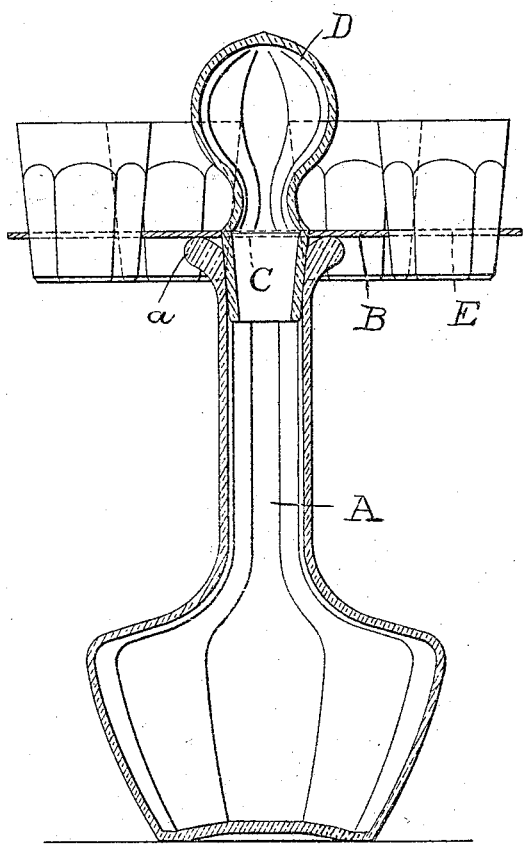

In the accompanying drawing:—Figure 1 represents the invention in side elevation; and Fig. 2 is a section taken longitudinally of the decanter.

In these figures, A represents the decanter, which may be of any ordinary or improved design. It has a flaring upper lip shown at *a*, and this supports a holder B made of metal, cardboard, or any suitable material, having a series of openings E to receive wine glasses of any shape or style, and a central opening C, which coincides with the opening in the neck of the bottle. By resting the disk or glass carrier upon the upper end of the bottle, the stopper D, made of glass or other suitable material, is fitted into the neck of the bottle, passing through the opening in the carrier, and not only serves the purpose of closing the decanter, but of holding the glass carrier in place. On the removal of the stopper, the carrier may also be removed, and may be utilized as a waiter to present the glass of wine or other liquid to the visiting guest or customer.

What I claim is:—

In combination with a decanter, a carrier or holder having a central opening and adapted to be supported upon the upper end of the decanter with the central opening in line with the mouth of the decanter, the holder or carrier having a series of openings to receive wine glasses, the carrier being held in place by the stopper of the decanter passing through the opening into the mouth of the bottle, substantially as described.

In testimony whereof, I affix my signature in presence of two witnesses.

JACOB H. FRIEDENWALD.

Witnesses:
 MARIE MORAN,
 ETHEL KING.